United States Patent [19]

Leuthesser et al.

[11] 4,038,946
[45] Aug. 2, 1977

[54] FISH FARM AND WATER CONDITIONING APPARATUS

[76] Inventors: Lance E. Leuthesser, 6054 Forest Hill Blvd., Apt. 207, West Palm Beach, Fla. 33406; Edward G. Leuthesser, 1515 Lake Drive, Delray Beach, Fla. 33344

[21] Appl. No.: 640,648

[22] Filed: Dec. 15, 1975

Related U.S. Application Data

[62] Division of Ser. No. 510,600, Sept. 30, 1974, abandoned.

[51] Int. Cl.² .............................................. A01K 63/00
[52] U.S. Cl. ...................................................... 119/5
[58] Field of Search .................................... 119/3, 5

[56] References Cited
U.S. PATENT DOCUMENTS

| | | | |
|---|---|---|---|
| 1,860,698 | 5/1932 | Venditti | 119/5 |
| 3,247,826 | 4/1966 | Girard | 119/5 |
| 3,726,251 | 4/1973 | Fremont | 119/3 |

*Primary Examiner*—Hugh R. Chamblee

[57] ABSTRACT

A generally closed loop fish rearing system and water conditioning apparatus, including a fish rearing tank with an aeration system and a generally flat floor, a biological means for removal of certain dissolved impurities, having an input conduit connected to the outlet in the fish rearing tank, a dissolved air flotation means for the removal of suspended solids and certain dissolved impurities, having an input conduit connected to the outlet in the biological means, and a fish rearing tank inlet conduit connected to the outlet in the dissolved air flotation means. The aeration system includes an air pressure means, and a distribution system. The distribution system includes a plurality of pre-fabricated air discharge holding means connected to the said conduits, and a plurality of aerating discharge means connected to said air discharge holding means to aerify and mix the water in said fish rearing tank.

2 Claims, 10 Drawing Figures

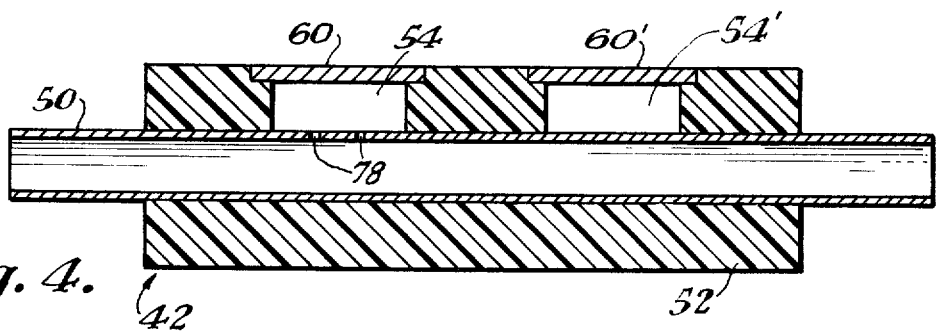
Fig. 4.
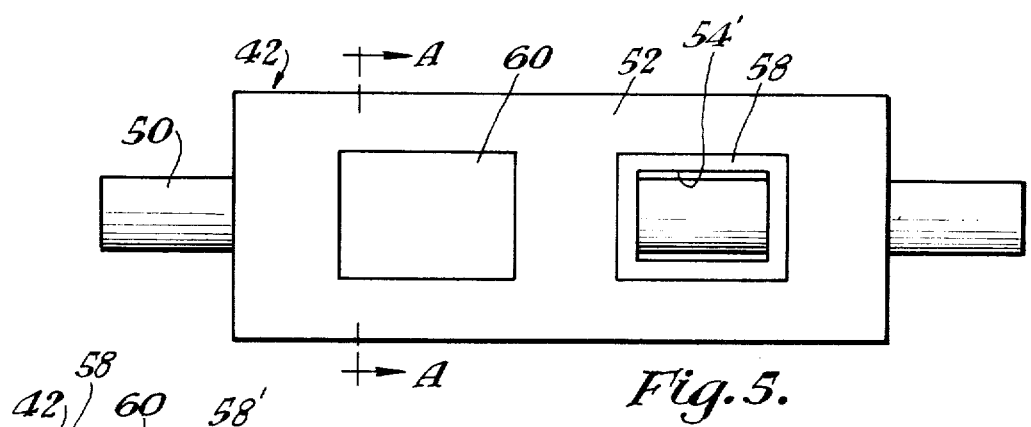
Fig. 5.
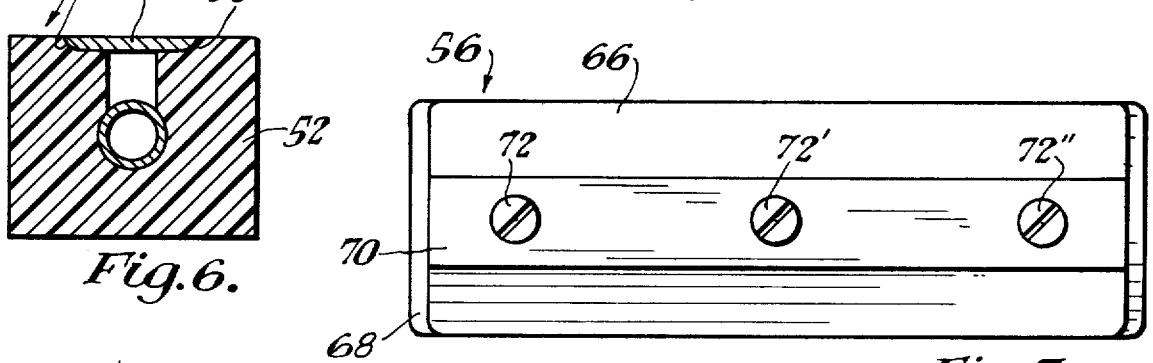
Fig. 6.
Fig. 7.
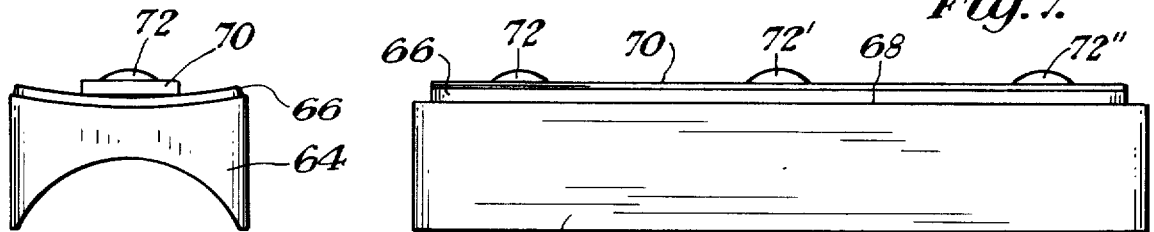
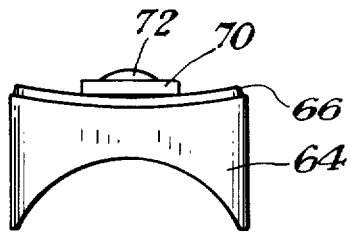
Fig. 9.
Fig. 8.
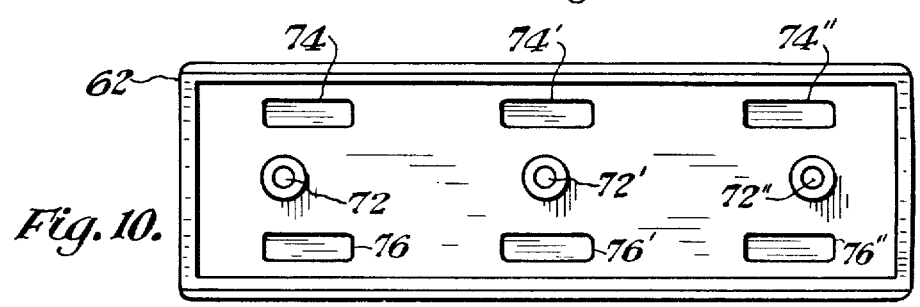
Fig. 10.

FISH FARM AND WATER CONDITIONING APPARATUS

This is a divisional application of application Ser. No. 510,600, filed Sept. 30, 1974, now abandoned.

BACKGROUND OF THE INVENTION

This invention relates to a generally closed loop fish rearing system and water conditioning apparatus, and more particularly, to a fish rearing tank with an aeration system terminating at the surface of the generally flat floor of the fish rearing tank.

In the past, various designs for generally closed loop fish farming systems have been proposed and utilized. Such systems use a plurality of filtering devices in the closed loop system in an attempt to purify waste water from a fish rearing tank. The fish rearing tanks have included various aerating means generally positioned above the planer surface of the floor of the fish rearing tank. The prior art fish farming systems have not produced the standard of quality required to properly raise and care for a high density fish population in a fish rearing tank at a realistic production cost.

BRIEF DESCRIPTION OF THE INVENTION

A first rearing system and water conditioning apparatus, including a fish rearing tank a biological means, and a dissolved air flotation means. The fish rearing system and water conditioning apparatus is connected together into a generally closed loop system in which the water is re-circulated through the fish rearing tank. The biological means and the dissolved air flotation means are utilized to maintain the proper quality of the water for rearing fish in the fish rearing tank.

The fish rearing tank includes an aeration means to aerify the water in the tank and to aid the circulation of the culture water within the fish rearing tank to properly mix unused feed and metabolic waste products of the fish in the tank water. These contaminants, both the suspended solids and dissolved impurities, are passed out of the fish rearing tank with the exiting water for proper treatment. The fish rearing tank also includes a water input distribution system that aids in the mixing of the water in the tank.

The aeration system includes an air pressure means connected to a distribution system. The distribution system is connected to the fish rearing tank. The fisth rearing tank is constructed with a generally flat floor surface having a prefabricated air discharge holding means embedded thereunder. The upper surface of the pre-fabricated air discharge holding means is in the plane of the flat floor surface. The aeration means are connected to the pipeline in the pre-fabricated air discharge holding means. A plurality of aeration means are located at particular positions across the floor of the tank to aerify the water in the tank and to circulate the water in order to sweep the bottom of the tank. The circulating tank water keeps all the particles in suspension in order to discharge the impurities out of the fish rearing tank into the water conditioning means with the discharge water.

The aerating means includes a body positioned just below the surface of the fish rearing tank with an upper diaphragm having an upper surface lying in the general plane of the floor of the fish rearing tank.

It is an object of this invention to provide a generally closed loop fish rearing system including a fish rearing tank with an aerating means and various water conditioning means for conditioning the culture water in order to maintain the proper water quality for rearing fish.

It is another object of this invention to provide an aeration system for circulating the water in the fish rearing tank in order to throughly mix the water before it passes through the outlet of the fish rearing tank in order to carry off waste products.

Another object of this invention is to provide a non-complex, economical method of constructing a fish rearing tank with a generally flat floor surface, having aeration means at the planar surface of the floor.

Another object of this invention is to provide a non-complex aeration means that distributes fine bubbles into the fish rearing tank water.

Another object of this invention is to provide a pre-fabricated air discharge holding means including a removable insertion plate that allows the aeration means to be generally connected in a position flush with the generally flat floor surface of the tank after the concrete floor is poured around the pre-fabricated air discharge holding means.

Another object of this invention is to provide an aeration means designed to produce aerating bubbles in a pattern to sweep the flat floor of the reservoir and keep all particles in suspension in the tank water.

A further object of this invention is to provide a one-step biological water conditioning means in order to remove dissolved impurities and to aerate the culture water.

A further object of this invention is to provide a one-step dissolved air flotation cell for removing suspended solids as well as high molecular weight contaminants, and to further aerate the culture water.

An additional object of this invention is to provide a single, low-cost water conditioning means with fewer components and improved maintenance characteristics which do not require backwashing or cleaning of the main tank.

In accordance with these and other objects which will be apparent hereinafter, the instant invention will now be described with particular reference to the accompanying drawings.

BRIEF DESCRIPTION OF THE DRAWINGS

In the drawings:

FIG. 4 is a side view in cross-section of the pre-fabricated air discharge holding means;

FIG. 5 is a top view of the pre-fabricated air discharge holding means;

FIG. 6 is a front view in cross-section of the pre-fabricated air discharge holding means in FIG. 5 taken along lines A—A looking in the direction of the arrows;

FIG. 7 is a top view of the aerating means;

FIG. 8 is a side view of the aerating means;

FIG. 9 is a front view of the aerating means; and

FIG. 10 is a bottom view of the aerating means.

DESCRIPTION OF A PREFERRED EMBODIMENT

Figure 1:
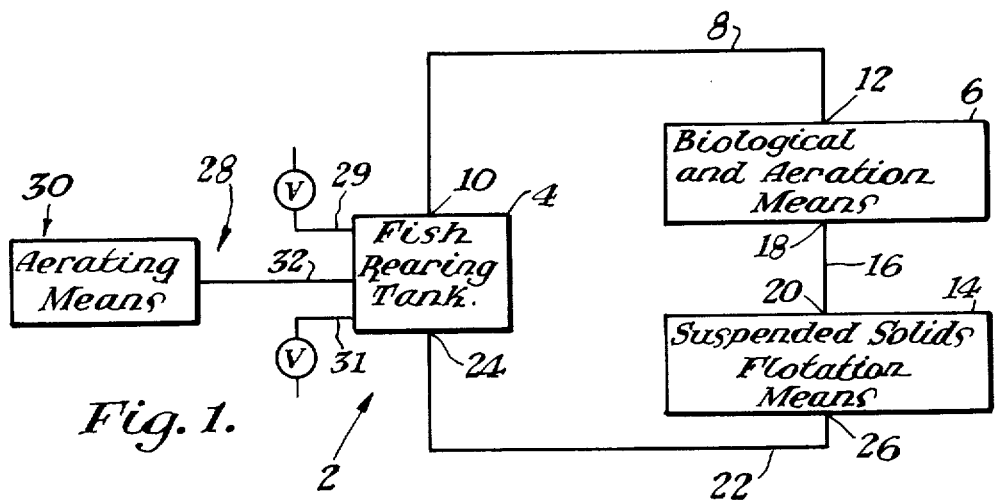
FIG. 1 is a block diagram of the generally closed loop fish rearing and water conditioning apparatus.
Figure 3:
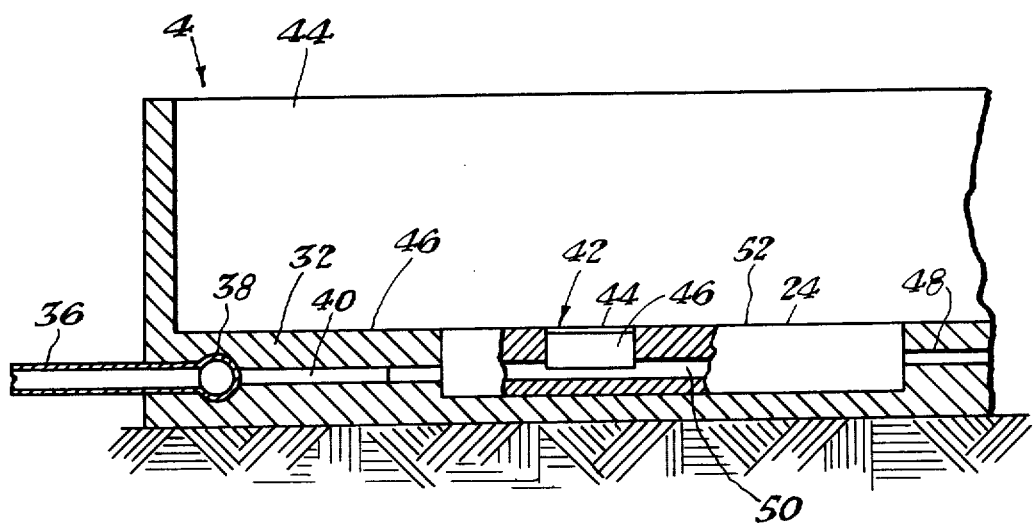
FIG. 3 is a partial side view of the fish rearing tank in cross-section.

Referring now to FIG. 1, showing a closed loop fish rearing and water conditioning apparatus, the apparatus, generally designated by 2, includes a fish rearing tank 4, shown in detail in FIG. 3, a biological means 6, and a dissolved air flotation means 14.

The biological means with an aeration means 6, has a first conduit 8, connected between the outlet 10 of the fish rearing tank 4, and the inlet 12, of the biological means and aeration means 6. The dissolved air flotation means 14 has a second conduit 16 connected between the outlets 18 of the biological means and aeration means 6 and the inlet 20 of the dissolved air flotation means 14. A third conduit 22 is connected between the inlet 24 of the fish rearing tank 4 and the outlet 26 of the dissolved air flotation means 14. The fish rearing tank 4 is supplied with air under pressure by the aeration system, generally designated by 28 in order to aerify the water in the tank. The aeration system 28 includes an air pressure supply means 30 and a distribution system 32.

The fish rearing and water conditioning apparatus as shown in FIG. 1 includes a new and improved means for conditioning the fish farm water in the generally closed loop fish rearing and water conditioning apparatus. The water is recycled from the outlet 10 of the fish rearing tank 4 into various water conditioning devices as shown at 6 and 14, for conditioning the culture water to maintain the proper quality for rearing fish before returning the water to the inlet 26 of the fish rearing tank 4. When the closed loop system is employed for the production of fish as a food product, the system is required to operate with maximum possible efficiency in order to provide an optimum production of the fish product.

Large amounts of feed are placed into the fish rearing tank 4, during the production cycle to feed a high density of fish in the tank. Consequently, the water tends to become contaminated from the metabolic waste products of the fish, as well as contamination from the ordinary breakdown of the uneaten feed. The resulting contaminants fall generally into two categories, solids in suspension and dissolved impurities. The present invention provides a new and improved means in the fish rearing tank for holding the solids in suspension or placing unsuspended solids in suspension. The aerating system 28 if utilized to provide oxygen for the fish in tank 4 as well as to aid in the stirring of the solids in the water and to aid in placing the solids in suspension and to maintain the solids in suspension. The solids are kept in suspension in order to move the contaminants out through the outlet 10 during the normal movement of the circulating water in the closed loop system.

When the contaminated fluid from the fish rearing tank 4 is passed through the first pipeline 8, it is placed into the biological means and aeration means 6 in order to effectively remove the dissolved impurities in the contaminated water.

The biological means 6 having an inlet 12 and an outlet 18 is an enclosure containing a plurality of prefabricated members. The pre-fabricated members have a large surface area in relationship to the volume of the enclosure. The surface area is used to grow micro organisms for conditioning the water passed over the pre-fabricated members. The large surface also provides the water flowing over the pre-fabricated members with an expanded water surface area for aerating purposes.

The flotation means 14 includes a generally large tank (not shown) and a smaller pressure vessel (not shown). A first portion of the water from conduit 16 is pumped into the pressure vessel, approximately 30 percent (30 %). The other portion of the water is fed directly into the large tank. After air is dispensed into the first portion, the mixture is retained at elevated pressure for a period of time. The air, therefore, becomes dissolved in the contaminated water in proportion to the particular elevated pressure. The contaminated water will thus become saturated with the air at the elevated pressure. Pressure on the first portion is immediately reduced to ambient pressure and a portion of the air is therefore released from the super saturated condition. The first and second portions of the contaminated water are rejoined and thereafter, passed into the generally large flotation tank through a still well (not shown). The released air forms minute bubbles within the contaminated water located in the flotation means. As the fine air bubbles rise they form a dense blanket across the upper portion of the flotation means. The dense blanket consists of a slowly rising mass of fine bubbles. The fine bubbles effect the separation of suspended solids and certain dissolved impurities. Suspended solids ranging down to colloidal size are attracted to the many gas-liquid interfaces and effectively separate from the dispersion medium as they are floated to the surface and thereafter skimmed away. Many of the dissolved organic materials present in the contaminated water are of a very high molecular weight, such as starches and proteins. Such high molecular weighted contaminants are of a size comparable to the colloidal particles. Therefore, the high molecular weighted contaminants are similarly adsorbed on the gas-liquid interface and floated off during the separation process. The treated water is then removed from the flotation means through the conduit 22 connected at 26. The water is passed into the fish rearing tank 4 through line 22 connected at 24.

A fresh water conduit 29 may be connected to the fish rearing tank 4 to supply additional water. An excess waste water conduit 31 may also be connected to the fish rearing tank 4 to discharge waste water.

Figure 2:
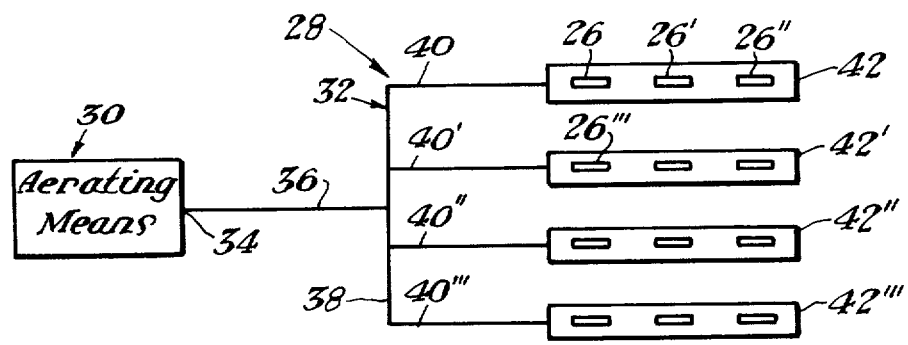
FIG. 2 is a plan view of the aeration system partially in block diagram.

Referring now to FIG. 2, the aeration system 28 includes the aeration supply means 30 connected to the distribution system 32. The aerating supply means 30 may include various types of air pumping mechanisms and apparatus. The aerating means 30 is connected to the distribution system at outlet 34. The distribution system 32 includes pipeline 36 connected to the trunkline 38. From the main trunkline 38 a plurality of sublines 40, 40' and 40", 40'" are utilized to carry the air to the various pre-fabricated air discharge holding means 42, 42', 42", and 42'". Various patterns may be utilized in the fish rearing tank. Each sub-line 40 may be connected to one or more of the prefabricated air discharge holding means.

Referring now to FIG. 3 showing a cross-sectional view of the fish rearing tank, the main line or conduit 36 is connected to the main trunkline 38 with a plurality of branch lines, one of which is shown at 40. The sides of the tank 44 may be metal, concrete, or other suitable material. The flat floor 46 of the tank may be constructed of poured concrete or other suitable materials. The pre-fabricated air discharge holding means 42 is embedded into the floor having a smooth upper surface in the plane of the surface of the floor of the tank 4. The pre-fabricated air discharge holding means 42 is also shown in FIGS. 4, 5, and 6. An additional pipeline 48 may additional additonal pre-fabricated air discharge holding means along the aeration system.

The pre-fabricated air discharge holding means 42, as shown in FIG. 4, 5 and 6, is constructed with an internal pipe 50 having a cast body portion 52. The upper portion of the body 52, in a first embodiment, includes diffuser bodies 54 and 54' molded into the air discharge holding means. In a second embodiment, numbers 54 and 54' may represent openings in which the diffuser bodies may be placed after the air discharge holding means is placed in position for construction of a fish rearing tank. Therefore, the aerating means 56, shown in FIGS. 7 through 10, may be placed with cap members 60 and 60', shown in FIGS. 4, 5 and 6, in the openings after construction of the cast body portion 52 or may be placed in the mold prior to pouring the cast body portion 52.

The upper portion of the openings 54, as shown in FIGS. 4, 5 and 6, may be shaped to provide arcuate surfaces 58 and 58' along the sides adjacent the top of the opening. When the pre-fabricated air discharge holding means are placed in the area that will become the floor of the fish rearing tank 4, the upper surface of cap members 60 and 60' are positioned in the plane of the proposed floor. The cap members 60 and 60' cover the opening to prevent concrete from moving past the cap members and contacting the diffuser body during the pouring of the concrete floor.

The aerating means, as shown in FIGS. 7 through 10, include a generally rectangular diffuser body 62 having an arcuate end portion 64 that fits around the conduit 50, shown in FIG. 5, 6, and 7, in the pre-fabricated air discharge holding means. On the upper portion of the aerating means, a resilient member 66, as shown in FIGS. 7 through 10, is secured, having a ribbed underface 68. A holding plate 70 is placed over the screw members 72, 72' and 72". Under the resilient member 66 are openings 74, 74', 74" and 76, 76' and 76". The air is moved under pressure through conduit 50 through sized openings 78 in the pipe into the aerating means 56 and out through the openings 74 and 76 under the resilient member 66. Other diffuser bodies and attaching means may be utilized. The flat floor and ease of construction is important since 760 diffusers may be used in a single 10,000 square foot fish rearing tank, sized 165 feet by 60 feet.

The fish rearing tank floor is constructed in the preferred embodiment by first construction a form for manufacturing the pre-fabricated air discharge holding means. The caps and diffusers are first placed in the bottom of the mold with the conduit connected thereto. The ends of the conduits are sealed. The concrete is poured into the mold to form the holding means. The aeration distribution system is formed on the ground with the holding means attached. The upper surfaces of each holding means are placed in a common plane. The floor is then poured around the holding means.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of constructing a fish rearing tank floor with a generally flat floor and aeration means for the tank water comprising the steps of;

pre-fabricating at least one discharge holding means each of which includes an inlet, and an outlet adjacent an upper surface, at least one aerating discharge outlet therein connected to said inlet, positioning each said holding means with its upper surface in the plane of the proposed floor surface, placing air pressure conduits below the proposed upper floor surface and connecting each said holding means inlet to said conduits, and pouring a flooring material up to the surface of said holding means to provide a generally flat fish rearing floor.

2. A method as set forth in claim 1, including the steps of;

pre-fabricating a plurality of said holding means, positioning a plurality of said holding means with each upper surface in the plane of the proposed floor surface, placing a cap means over each said discharge outlet in said holding means prior to pouring the floor material, pouring a concrete flooring material up to the surface of each said holding means to provide a generally flat fish rearing floor having an upper surface in the same general plane, and thereafter removing each said cap means for providing aeration from the fish rearing tank floor.

* * * * *